UNITED STATES PATENT OFFICE.

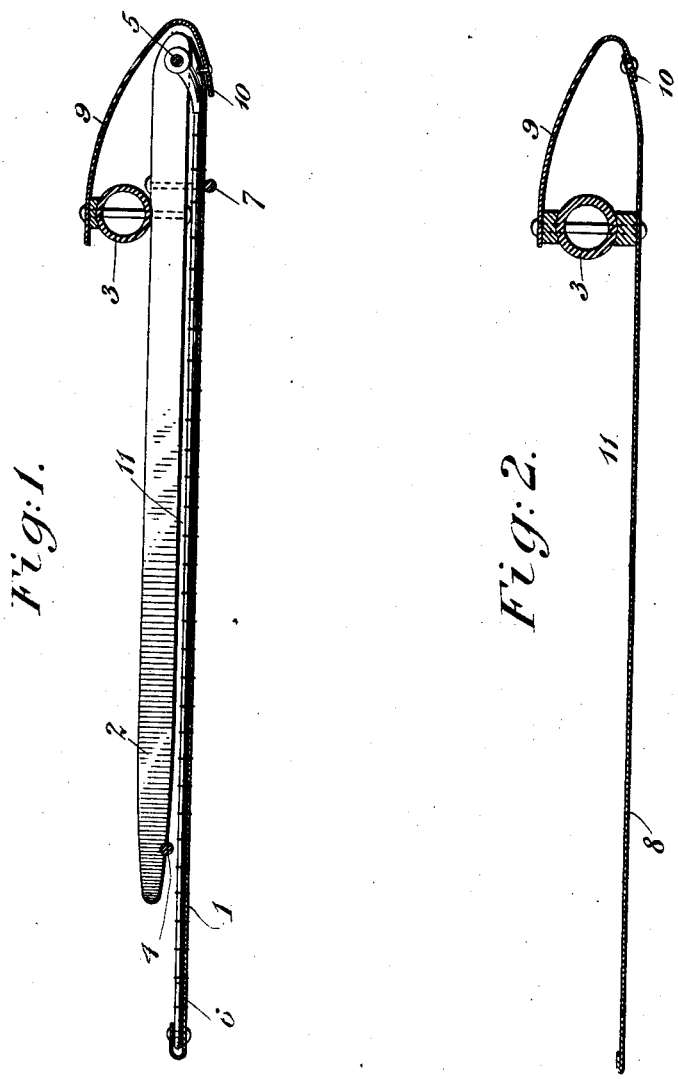

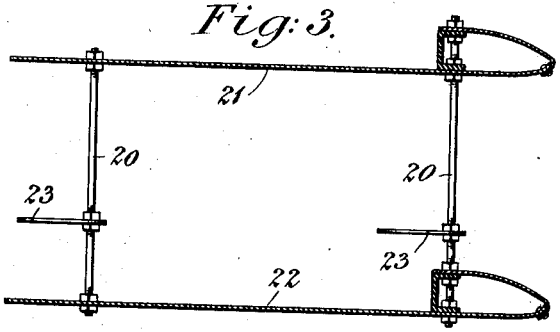
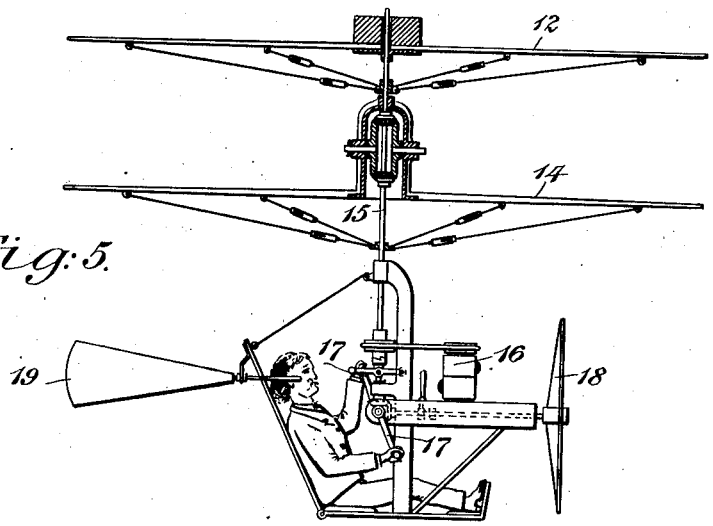
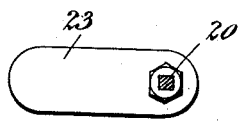

JOHN P. HOLLAND, OF EAST ORANGE, NEW JERSEY.

FLYING-MACHINE.

1,050,654.

Specification of Letters Patent. Patented Jan. 14, 1913.

Application filed December 2, 1907. Serial No. 404,698.

*To all whom it may concern:*

Be it known that I, JOHN P. HOLLAND, a citizen of the United States, residing at East Orange, in the county of Essex and State of New Jersey, have invented certain new and useful Improvements in Flying-Machines, of which the following is a specification.

This invention relates to devices designed to enable the aeronaut to utilize that natural force, air rarefaction, defective air pressure, or partial vacuum which is employed in nature by all flying animals during steady flight through the air as a chief source of support for their weight. It is true that direct air reaction under the wings is employed while the animals are rising and alighting, but only a small proportion of their support is derived therefrom during horizontal flight. According to my invention these devices are designed to produce and maintain rarefaction of air, defective pressure or partial vacuum over, or in front of the supporting and propelling surfaces of the flying machines; viz. over the aeroplanes, vibrating or revolving wings or propeller blades, and in front of the propeller or equivalent devices employed for propulsion. These devices are also employed to utilize for lifting or for lifting and propelling force, the compensation positive pressure produced under or back of such surfaces by the reduction of the air pressure produced over or in front of them.

An important feature of the present invention relates to the formation, in vertical transverse section, of the wings, aeroplanes, or propeller-shaped devices. The undersurfaces of these should be in the plane of the air stream passing backward, at each section of the wing or equivalent device during horizontal flight, or but slightly inclining upward toward their anterior edges about sufficiently to compensate for the slight upward bending of these surfaces when they are subjected to pressure.

In order that my invention may be the better understood, I have illustrated in the accompanying drawings, wherein—
Figure 1 is a section taken transversely and vertically through a wing or like sustaining member of a flying machine provided with my improvements; Fig. 2 is a sectional view similar to Fig. 1, but showing a modified form of the sustaining means; Fig. 3 is a sectional view taken vertically through two superposed planes provided with my improvements and constituting a modified form of the improved sustaining means; Fig. 4 is a fragmentary detail view which will be hereinafter referred to, and Fig. 5 is a vertical section taken through a modified form of the apparatus wherein revolving propellers are employed as a sustaining means.

Referring first to Fig. 1, the undersurface of the wing is shown as formed from a sheet 1 of varnished fabric which is extended beneath a frame-work or structure comprising a series of transverse bars 2, 2, spaced apart from each other and attached at points adjacent to their forward ends, to a wing arm 3. The point of attachment of these bars 2 to the wing arm will be by preference about one-sixth of the wing's width to the rear of its anterior edge; and they should not extend any farther to the rear than five-sixths of the width of the wing. The rear ends of the transverse bars 2 are connected by a wire 4 passing across the series from the inner to the outer transverse bar, and said wire is to act as a stop to prevent the posterior edge of the sail or fabric from rising much above the horizontal when the wing beats downward. 5 represents another wire extended across the series of bars 2, 2 at their forward ends and to this forward wire 5 there are attached the anterior ends of eight bamboo extension strips 6, fastened transversely to the sail along the whole length of said strips one or two such strips 6 lying between each two transverse bars 2, 2. Immediately under each transverse bar at the point where it is fastened to the wing arm there is fastened another wire 7 extending from the inner end of the wing to its tip. This wire 7 is set under the sail or fabric 1 and its transverse strips 6 in order to prevent the sail from hanging too low when the wing is rising at the beginning of flight. With this arrangement properly set up the posterior edge of the wing would drop downward 30 to 40 degrees as the wing tip is elevated at the beginning of flight. When the wing beats downward the wing's undersurface rises until the transverse strips fastened over it are stopped by the wire 4 extending between the posterior ends of the transverse bars 2, fastened to the wing arm 3. When speed forward is attained, or when the machine starts against a head wind, the wing sail's posterior edge does not drop downward because the defective pressure formed above it holds it against the wire 4, connecting the posterior ends of the transverse bars 2, 2. When the wing beats downward during flight there will be a much greater upward force exerted against the part of the wing sail 1 to the rear of the wing arm 3 than against the part forward of the arm because the after part is much wider. The posterior edge of the sail will therefore rise, and its anterior edge will descend thus forming a helical surface suitable for propulsion during the wing's descent. The wing arm should not be too rigid to yield to torsional force during the wing's descent. Because this force is greater toward the wing tips, owing to the greater vertical speed at the tips, the wing sail during the down beat will form a true helical surface.

If desired the sheet of fabric 1 forming the sail may be replaced by a sail made from sheet aluminum as shown at 8 in Fig. 2. As shown in Figs. 1 and 2, the forward part 9 of the upper surface of the plane or propeller blade when aluminum or other metal is employed is formed by bending the forward continuation of the undersurface, 8, or of an addition thereto of some suitable material, over and backward at the anterior edge of the said undersurface so as to form an upper, forward, curved section of the wing or plane as in the wing of a vulture or an albatross. The under part of the curved surface 9 should be lapped over the undersurface of the wing or plane, as indicated at 10, if it be not a continuation of the said undersurface in order to prevent a leak of air upward that would reduce the intensity of the defective pressure over the plane or wing and thus reduce its efficiency. The thickness of the wing or plane through the point of greatest convexity of the upper surface 9 should be from one-fifth to one-seventh of the width of the wings or planes depending on the horizontal speed desired. The thickness should be reduced to about one-tenth of the width of the lower plane in wings toward their tips. The width of the convexed upper surface 9 of the wings or planes should be about one-fourth to one-sixth of the width of the upper surface. An important aid to the production of air-rarefaction over the wing or plane is afforded by the cavity 11 over the lower surface of the wing or plane extending backward from the rear edge of the upper convexed surface 9 to the posterior edge of the wing or plane.

The width of the wing planes, or aeroplanes should be determined by the proposed horizontal speed of the machine. It is observable that the wings of the soarers seldom reach 10 inches in width even in a full grown vulture, or albatross, when the soaring speed is in the neighborhood of 30 miles per hour. They are more commonly only $7\frac{1}{2}$ to 8 inches wide even in large vultures.

For revolving wings, that is, wings arranged around a hub and shaft like an ordinary screw propeller, it is considered preferable to form them not of a fabric but either of thin spruce wood or of aluminum plates. Because the motion of these wings or blades will be always circular and not vibrating, there is no necessity for a hinge at the sail's forward edge or for stops to prevent it from rising; on the contrary, it must be held steadily on a plane transverse to the wheel's axis, with stays connecting its under surface to the axis of the wheel.

The pitch of the blades of propellers to be carried on vertical shafts for the purpose of elevating the machine in the air must be very small in order that the total thickness of the air stream intercepted by each blade may be intercepted by the blade's anterior edge near its lower surface, the main body of the stream being diverted over the upper convexed edge in order to assist in increasing the intensity of the air rarefaction over the blades. The pitch of the lower surface should be, at its center of effort, not greater than about one degree of inclination to the plane transverse to the axis of rotation.

In Fig. 5, I have shown a form of the apparatus wherein rotatory fans or propellers 12 and 14 are employed in lieu of vibrating wings or propellers, said fans 12 and 14 being mounted to turn upon the same vertical axis, and being arranged one above the other and being reversely driven from a vertical shaft 15, actuated from a motor 16, which may be of the internal combustion type. Cranks 17 are also provided so that the shaft 15 may be driven manually when desired. Where this construction is employed, it is evident that the operation of the fans or propellers 12 and 14 gives rise to a gyroscopic action which renders it impracticable to incline the axis of rotation of said fans or propellers in such a way as to permit of utilizing said propellers as a means of propulsion in lateral directions through the air. They cannot be inclined on account of the gyroscopic action. It is, therefore, necessary to employ for propulsion a screw propeller 18 having a horizontal axis, to be operated by the motive power that operates to elevate the machine, or by an auxiliary power. The propeller 18 is also driven from the motor 16, or cranks 17 at will, and suitable clutches and speed controlling means are provided to permit propellers 12 and 14 and 18 to be simultaneously driven from the motor or cranks at any desired relative speeds or to permit the propeller 18 to be driven from one of said actuating mechanisms while the sustaining means are driven from the other mechanism. The direction of motion will be controlled by an ordinary rudder 19 and control in the vertical direction will be exerted, for considerable elevations or depressions by controlling the speed of the elevating or sustaining means. This gyroscopic action of the fans or screws 12 and 14 and their axes, set vertically, in order to cause elevation of the machine, is not without its advantages because it virtually eliminates the difficulty of attaining stability with a heavier than air machine, as well as the problem of balancing. It will be possible for people to move in this machine without causing inconvenience in the matter of equilibrium and balancing. It will also render the question of the stowage of freight, or passengers, and the loss of trim from fuel consumption, matters of slight importance. The fan or propeller 18 may also be employed for cooling the motor 16 when desired.

It will be clearly apparent that the conditions that determine the wing's width in nature are identical with those that are required to produce and maintain air rarefaction over those surfaces. A study of the transverse vertical section of a bird's wing when it is extended in flight will render it clear that air rarefaction must exist, during flight, over the greater part of its upper surface when a certain speed is attained. The wing in this case moves approximately edgewise through the air, at good speed, and the air stream may either impinge on the undersurface or move parallel with it. The intercepted air stream is divided by the anterior edge of the wing or plane; the body of the stream represented by the greater part of the wing's thickness at each transverse section of the wing, or plane, being deflected upward and over the wing's curved, forward, upper section, the extreme forward edge of which is nearly on the same plane as the undersurface of the wing. The air thrown upward by the wing's curved edge cannot recurve instantly and come into close contact with the upper surface on account of its inertia. The air pressure therefore drops below atmosphere between the passing current of air and the wing's upper surface; the space between them being probably filled by eddying currents at a pressure below that existing in the free air depending on the relative speeds of the air current and the wing and on the degree of their inclination to each other.

How very small may be the proportion or degree of defective pressure over the wings required for support in the case of a soaring albatross may be easily ascertained. The bird's weight, 20 pounds may be considered as being supported solely by the positive compensating pressure produced by the air rarefaction produced over the supporting surfaces. The bird's weight 20 pounds is supported by approximately 800 square inches of wing and tail surface. 20 divided by 800 equals one-fortieth; that is the one fortieth of one pound positive pressure for square inch developed by the corresponding air rarefaction produced over the upper surfaces carries the bird's entire weight.

My invention also relates to devices for maintaining unimpaired the air rarefaction, defective pressure, or partial vacuum over, or in front of the surfaces where it is desired that it may exist. For example in the case of superposed aeroplanes as shown in Fig. 3, light posts or struts 20, 20 are employed to hold the planes 21 and 22 apart and to connect them together. Said posts generally extend in an approximately vertical or but slightly inclined direction, from the upper plane 21, or close thereto, to the lower plane 22 or in its near neighborhood. Now this slightly inclined post in moving sidewise through the air causes the air to flow in stream lines from front to rear around it, the air immediately in front of the middle line of the post 20 being compressed and the air aft of the post being rarefied owing to the friction of the passing stream of air on each side of the post against the dead air in the approximately triangular space formed by the two passing air streams on either side, and by the post as its base. When the aeroplanes are in action the air passing under the upper plane 21 is generally under compression while the air over the lower plane 22 is rarefied. The nearly vertical posts will, therefore, have their upper ends in or in the near neighborhood of air that is compressed, while the lower ends of the same posts end in places where the air is rarefied. These opposite conditions at opposite ends of the posts cause an air stream to flow downward in front and rear of the posts from the ends around which the air is compressed to the ends around which defective pressure or air rarefaction exists. Under such conditions a stream of air flows downward in such volume as to seriously reduce the intensity of the partial vacuum or air rarefaction existing over the lower plane thus reducing its supporting efficiency. When there are several such posts connecting the upper and lower planes the intensity of the air rarefaction existing over the lower planes is much reduced and the lifting efficiency of the lower plane is correspondingly neutralized. Stays, braces, struts or posts ending on any surface on which it is desired to produce air rarefaction are similarly liable to mar the efficiency of said surfaces unless they be provided with a device to prevent the flow of air toward the surface on which it is desired to produce air rarefaction, partial vacuum or defective pressure. This device consists of a plate or diaphragm 23 of some suitable material and of sufficient area fixed transversely to the post strut brace or stay having a length in the direction of motion of the machine of about ten times the fore-and-aft diameter of the obstruction and a width of about one half its length. This deflecting plate or diaphragm should be fixed above the surface which it is designed to render more efficient in the plane of the passing air stream, at a distance of one third to one-fourth of the width of said surface. Similar protection by means of plates or diaphragms must be provided between surfaces over, or in front of which it is desired to produce air rarefaction in order to prevent an induced flow of dead air into the spaces over said surfaces and thus aid in producing and maintaining air rarefaction over, or in front of these surfaces.

Having thus described my invention, what I claim and desire to secure by Letters Patent is—

1. An apparatus of the character described having a sustaining device provided with a rigid portion, the forward edge of which has an upwardly and a rearwardly inclined portion adapted to deflect the air passing above it out of contact with said rigid portion, a wing arm interposed between the rigid portion and the rearwardly inclined portion and means for securing said rearwardly inclined portion to the wing arm.

2. An apparatus of the character described having a sustaining device provided with a rigid portion the forward edge of which has an upwardly and a rearwardly inclined portion adapted to deflect the air passing above it out of contact with said rigid portion, a wing arm interposed between the rigid portion and the rearwardly inclined portion and extended transversely thereof and means for securing said rearwardly inclined portion to the wing arm.

In witness whereof I have hereunto signed my name this 22nd day of November 1907, in the presence of two subscribing witnesses.

JOHN P. HOLLAND.

Witnesses:
J. D. CAPLINGER,
ALAN F. CONNELL.